United States Patent
Majkrzak

(10) Patent No.: US 7,354,067 B2
(45) Date of Patent: Apr. 8, 2008

(54) COMPACT CASTER WHEEL SYSTEM

(76) Inventor: David S. Majkrzak, 528 Kingston Pl., West Fargo, ND (US) 58078

( * ) Notice: Subject to any disclaimer, the term of this patent is extended or adjusted under 35 U.S.C. 154(b) by 68 days.

(21) Appl. No.: 11/230,213

(22) Filed: Sep. 19, 2005

(65) Prior Publication Data
US 2007/0063501 A1 Mar. 22, 2007

(51) Int. Cl.
B60S 9/02 (2006.01)
B60B 11/10 (2006.01)
B60G 17/00 (2006.01)

(52) U.S. Cl. .............. 280/763.1; 280/764.1; 280/765.1; 280/766.1; 280/767.1; 280/6.154; 280/6.155

(58) Field of Classification Search ............ 280/763.1, 280/764.1, 765.1, 766.1, 767.1, 6.154, 6.155
See application file for complete search history.

(56) References Cited

U.S. PATENT DOCUMENTS

| | | | |
|---|---|---|---|
| 3,125,352 A * | 3/1964 | Gouin | |
| 3,386,747 A * | 6/1968 | Watt | |
| 3,793,752 A * | 2/1974 | Snyder | |
| 3,903,977 A | 9/1975 | Gillette et al. | |
| 4,275,902 A * | 6/1981 | Teja | 280/766.1 |
| 4,392,541 A * | 7/1983 | Barchard | 180/209 |
| 4,583,760 A * | 4/1986 | Halstensgaard et al. | |
| 5,388,949 A * | 2/1995 | Berg | |
| 5,772,284 A * | 6/1998 | Lindsey et al. | |
| 6,079,742 A * | 6/2000 | Spence | |
| 6,439,332 B1 * | 8/2002 | Meurer | 180/209 |
| 6,443,490 B2 * | 9/2002 | Webb | |
| 6,585,071 B2 | 7/2003 | Meurer | |
| 6,848,693 B2 * | 2/2005 | Schneider | |
| 6,913,248 B1 * | 7/2005 | Schmitz | |
| 7,150,472 B1 * | 12/2006 | Schneider | |
| 7,182,163 B1 * | 2/2007 | Gipson | |
| 2002/0139595 A1 * | 10/2002 | Whelan | 180/209 |
| 2003/0108413 A1 | 6/2003 | Pemberton | |
| 2004/0256815 A1 * | 12/2004 | Eichhorn et al. | |

OTHER PUBLICATIONS

Bobcat, "Backhoe Attachment", 6 pages.
Bobcat, "Options and Accessories—Add Value, Convenience and Comfort", 4 pages.

* cited by examiner

Primary Examiner—Christopher P. Ellis
Assistant Examiner—John R. Olszewski
(74) Attorney, Agent, or Firm—Patterson, Thuente, Skaar & Christensen, PA

(57) ABSTRACT

A compact caster wheel system for use with a skid steer vehicle, includes first and second auxiliary lift unit assemblies being spaced apart and disposable on respective left and right side margins of the skid steer vehicle and disposable rearward of the rearmost driving element and forward of the rear margin of the skid steer vehicle and projecting laterally from the respective left and right side margins less than the rearmost driving element, each of the first and second auxiliary lift unit assemblies having a respective housing assembly being couplable to the respective left and right side margins of the skid steer vehicle, first and second ram assemblies, a respective ram assembly being operably coupled to a respective one of the first and second auxiliary lift unit assemblies, and first and second ground engaging assemblies, a ground engaging assembly being operably coupled to a respective ram assembly such that actuation of the respective ram assembly effects shifting of the ground engaging assembly between an retracted, disengaged disposition and an extended, engaged disposition.

6 Claims, 6 Drawing Sheets

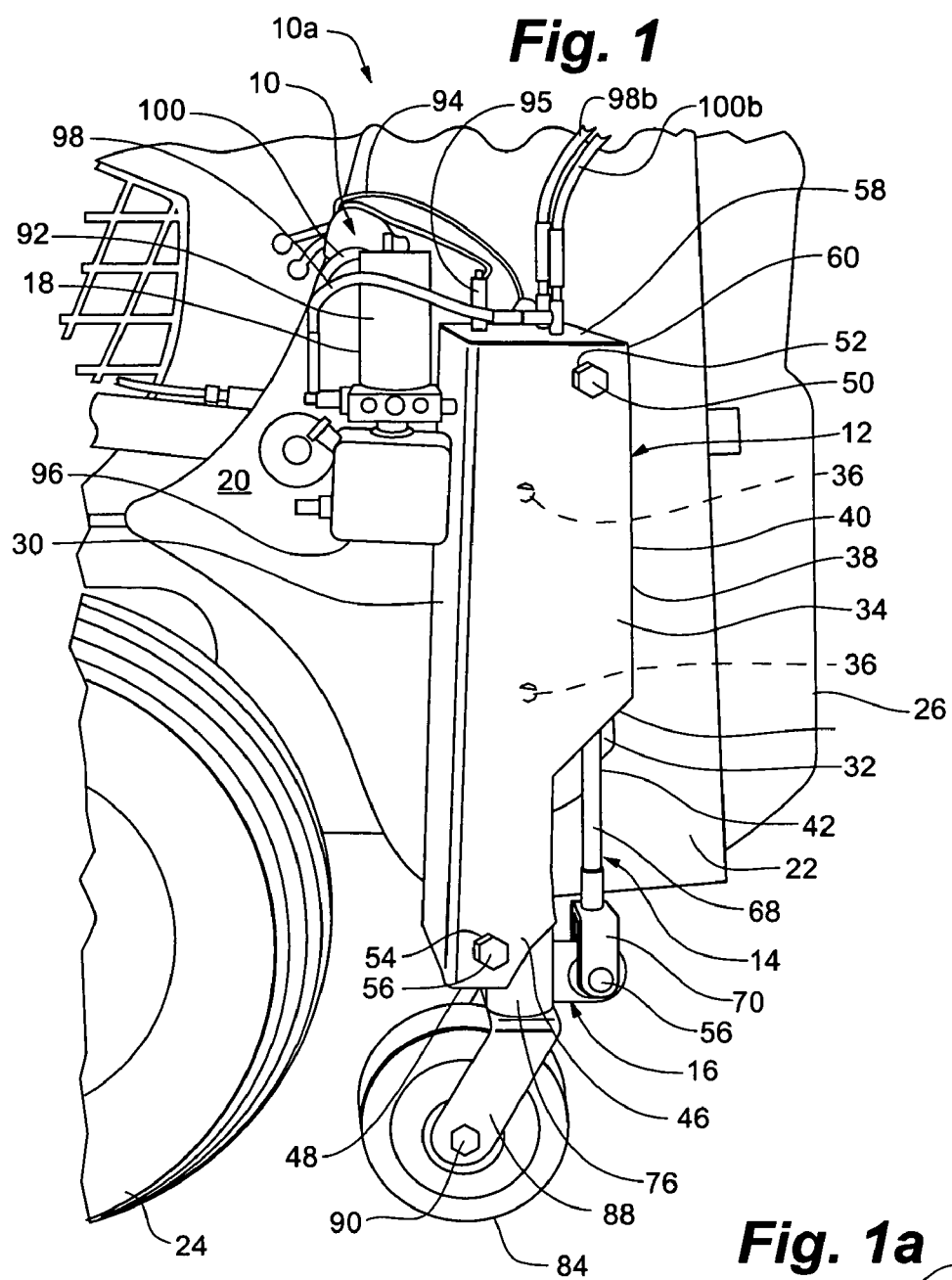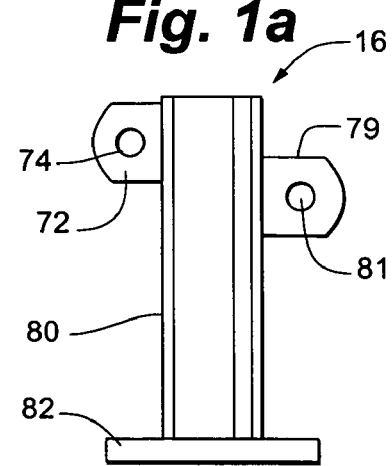

COMPACT CASTER WHEEL SYSTEM

TECHNICAL FIELD

The present invention relates to skid steer vehicles. More particularly, the present invention relates to a compact caster wheel system useful for elevating the rear wheels (or rear track portion) of the skid steer vehicle off the ground.

BACKGROUND OF THE INVENTION

The ubiquitous skid steer vehicle is highly useful vehicle for performing work, especially in relatively confined spaces. The skid steer vehicle is relatively compact and by skid steering, is capable of turning substantially about a vertical axis defined through the skid steer vehicle. Numerous attachments are designed or being designed for use on the skid steer vehicle, including all sorts of earth working attachments, lawn mowers, augers, snow blowers, stump chippers, concrete mixers and the like.

As noted above, the skid steer vehicle turns by skidding. None of the four wheels of the skid steer vehicle is steerable, but is always in a fixed relationship with respect to the chassis of the skid steer vehicle. Steering is performed by, for example, locking (or backing) the wheels on a first side and driving the wheels on the second side in a forward direction, or locking (reversing) a first track and driving the second track forward. In either case, a pivoting action is induced in the skid steer vehicle with resulting skidding of one or more of the wheels or one track. Such skid steering operation works quite well when the skid steer vehicle is being operated over loose soil or other relatively slippery surfaces. A problem arises when the skid steer vehicle is operated on a hard, dry, non-slippery surface such as asphalt or concrete, especially when the load being borne by the skid steer vehicle 20 causes generally equal weight distribution on the front and rear axles.

Skid steering on a hard, non-slippery surface rapidly wears down the tread of the tires (tracks) on the skid steer vehicle. Additionally, with the significantly greater resistance generated between the wheels and the hard surface, large side loads are imposed on the wheels and substantial powers demanded of the skid steer vehicle in order to effect the pivoting, skidding type steering. Accordingly, there is a need in the industry for providing a reduced amount of skidding of the skid steer vehicle when operated on hard surfaces. Advantageously, the device that performs this function should be semi-permanently mounted to the skid steer vehicle, generally within the existing envelope (footprint) of the skid steer vehicle, and convenient to operate. The envelope or footprint of the skid steer vehicle is the outline of the image projected on an underlying surface by the skid steer vehicle when viewed from above.

When performing work with the skid steer vehicle in a fixed location, such as backhoe operations, chipper/shredder, stump grinding, concrete mixing, and the like, the skid steer vehicle may undesirably bounce in a front to rear manner, or may actually tip rearward. There is a need to stabilize the rear of the skid steer vehicle during such operations.

Since skid steer vehicles are utilized in relatively limited spaces, it is desirable that any devices for meeting the aforementioned needs be limited in size and fall substantially within the existing footprint or envelope of the skid steer vehicle, both laterally and rearward. Additionally, virtually all makes of skid steer vehicles have a rear engine access door. This access door is typically hinged at one side and is opened relatively frequently for servicing of the engine of the skid steer vehicle. Accordingly, any device for meeting the aforementioned needs should not impair the ability to open the rear engine access door and should not substantially increase the footprint of the skid steer vehicle. And, the device should project laterally from the respective left and right side margins of the skid steer vehicle less than the rearmost driving element. Further, the device should not impair the approach angle of the skid steer vehicle when the device is in the retracted, non-engaged disposition.

SUMMARY OF THE INVENTION

The compact caster wheel system (or auxiliary lift system) of the present invention substantially meets the aforementioned needs of the industry. The device of the present invention is mounted rearward of each of the rear driving element (wheels or track) of the skid steer vehicle forward of the rear margin of the skid steer vehicle and projects outward laterally from the sideplate of the skid steer vehicle less than the lateral distance of the rear driving element of the skid steer vehicle from the sideplate. Thus the envelope of the skid steer vehicle is not disadvantageously increased either laterally or rearward by the addition of the compact caster wheel system to the skid steer vehicle. In this disposition, the present invention is semi-permanently mounted to the vehicle and need not be removed to facilitate any of the various operations that are performed by the vehicle. Additionally, the device of the present invention is mounted well clear of the rear engine access door of the skid steer vehicle in order to not impair opening of the rear access door. Further, the present invention is fully actuatable from in the cab from the retracted, non-engaged disposition to the extended, engaged disposition without external manipulations thereof.

The device of the present invention permits the alternate use of caster wheels or stabilizing feet. When using caster wheels, the caster wheels deploy and thereby raise the rear wheels (or the rear tracked portion of a tracked vehicle) of the skid steer vehicle off the underlying surface. In such manner, a first (the left front wheel, for example) front wheel can be operated in a forward direction, and a second (the right front wheel, in the example) front wheel can be operated in a rearward direction in order to affect a pivoting steer of the skid steer vehicle. The casters permit ready pivoting rotation about a vertical axis passing generally through the axle of the front wheels of the skid steer vehicle. The action eliminates the skidding of the rear wheels over the surface on which the skid steer vehicle is being operated.

Alternatively, a stabilizing foot can be brought into contact with the surface on which the skid steer vehicle is being operated on either side of the skid steer vehicle. Such action substantially increases the stability of the skid steer vehicle during stationary working operations, as noted above, and minimizes the possibility that the skid steer vehicle could tip rearward.

Further, by rotating the engaging portion into the retracted disposition, the present invention is greatly withdrawn from the underlying surface and therefore does not impair the approach angle (the rotational angle about a lateral axis of the skid steer vehicle) of the skid steer vehicle when the device is in the retracted, non-engaged disposition.

The present invention is a compact caster wheel system for use with a skid steer vehicle and includes first and second auxiliary lift unit assemblies being spaced apart and disposable on respective left and right side margins of the skid steer vehicle and disposable rearward of the rearmost driving element and forward of the rear margin of the skid steer vehicle and projecting laterally from the respective left and right side margins less than the rearmost driving element, each of the first and second auxiliary lift unit assemblies having a respective housing assembly being couplable to the respective left and right side margins of the skid steer vehicle, first and second ram assemblies, a respective ram assembly being operably coupled to a respective one of the first and second auxiliary lift unit assemblies, and first and second ground engaging assemblies, a ground engaging assembly being operably coupled to a respective ram assembly such that actuation of the respective ram assembly effects shifting of the ground engaging assembly between an retracted, disengaged disposition and an extended, engaged disposition. The present invention is further a method of supporting a rear portion of a skid steer vehicle.

BRIEF DESCRIPTION OF THE DRAWINGS

FIG. 1 is a side elevational view of a first embodiment of the present invention depicting the left side auxiliary hydraulic unit mounting an optional caster, the caster being in the extended, engaged disposition;

FIG. 1a is a side elevational of an optional stabilizing foot;

FIG. 6 is a perspective view of a linear actuator.

DETAILED DESCRIPTION OF THE PREFERRED EMBODIMENTS

The compact caster wheel system (or auxiliary lift system) of the present invention is shown generally at 10 in the figures. The compact caster wheel system 10 includes a left auxiliary hydraulic unit 10a and a right auxiliary hydraulic unit 10b. Preferably, the left and right auxiliary hydraulic units 10a, 10b are mounted spaced apart on either side of the skid steer vehicle and operate in conjunction with one another.

Figure 2:
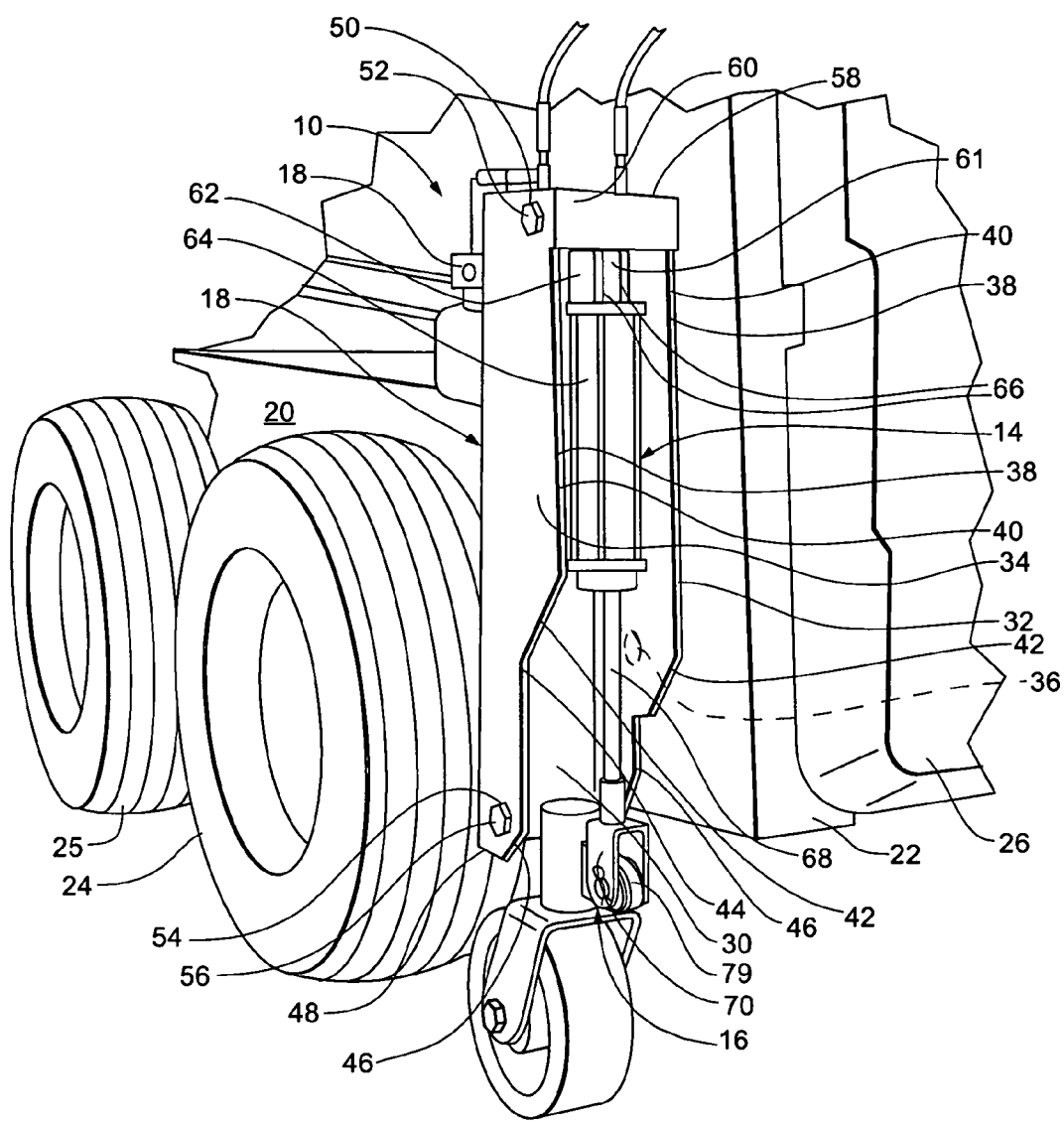
FIG. 2 is a rear quarter view of a first embodiment of the present invention depicting the left side auxiliary hydraulic unit mounting an optional caster, the caster being in the extended, engaged disposition.
Figure 3:
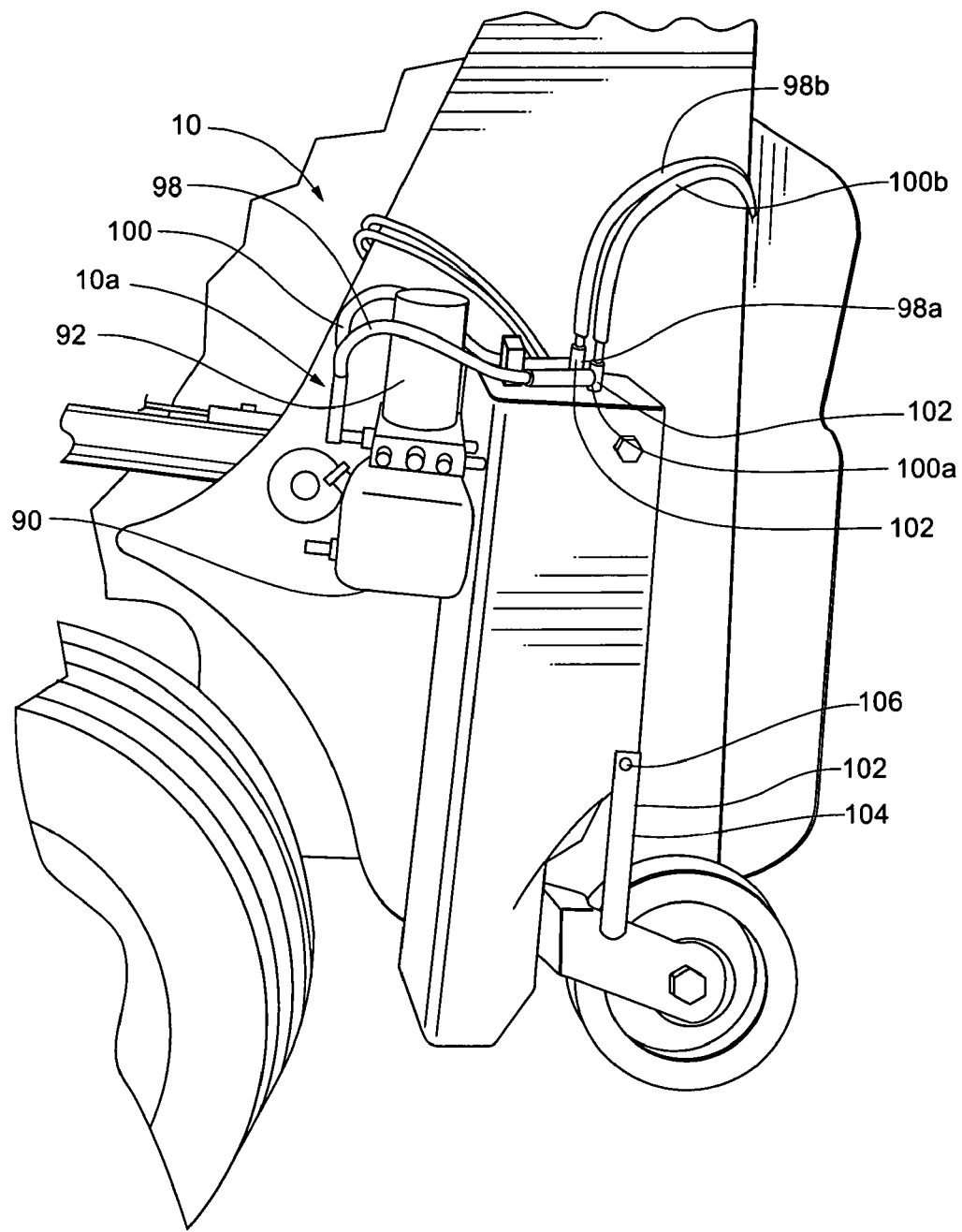
FIG. 3 is a side elevational view of a first embodiment of the present invention depicting the left side auxiliary hydraulic unit mounting an optional caster, the caster being in the retracted, disengaged disposition.
Figure 4:
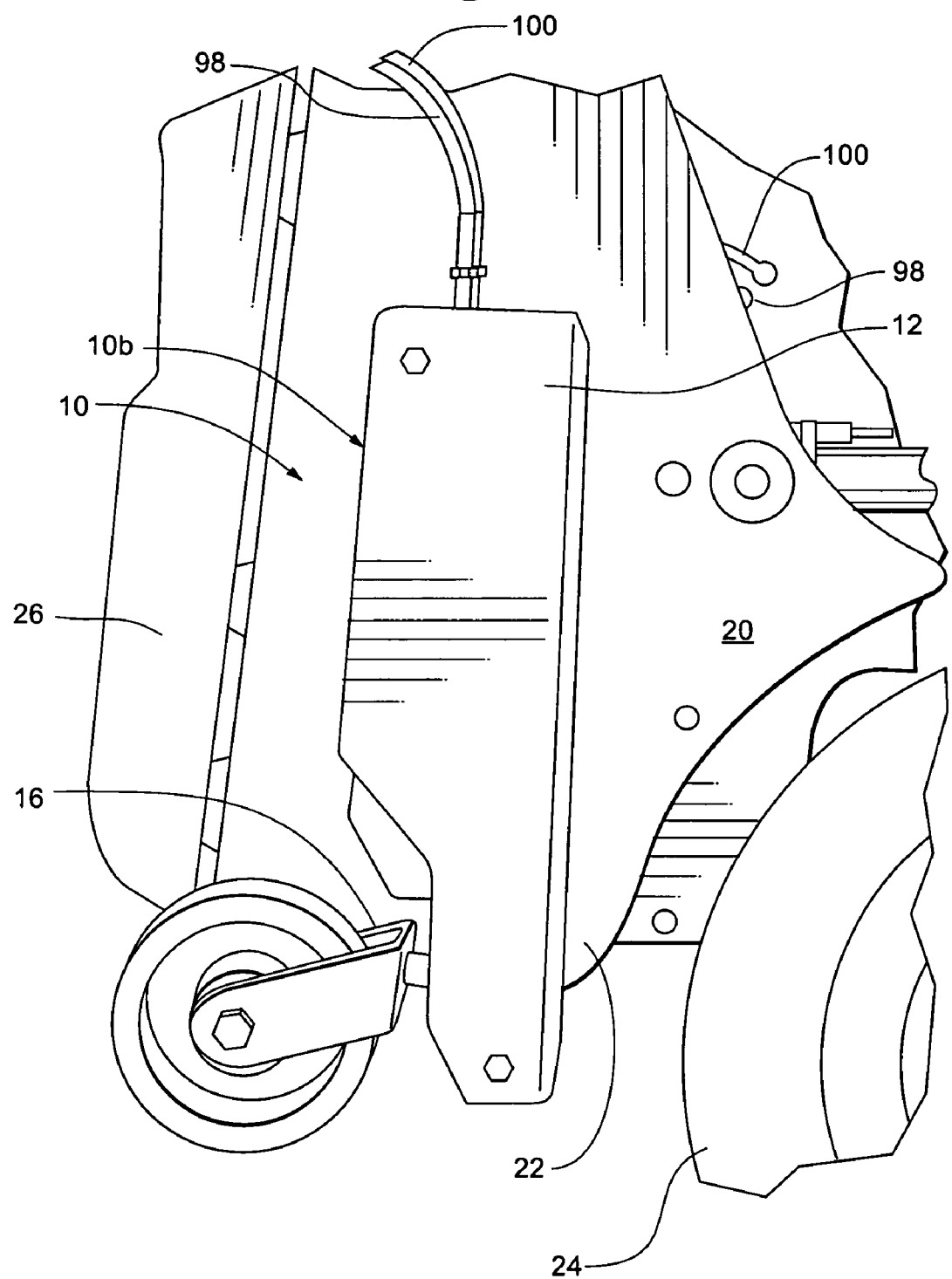
FIG. 4 is a side elevational view of a first embodiment of the present invention depicting the right side auxiliary hydraulic unit mounting an optional caster, the caster being in the retracted, disengaged disposition.

Referring to the first embodiment depicted in the FIGS. 1-3, each of the auxiliary hydraulic units 10a, 10b, includes a housing assembly 12, a hydraulic ram assembly 14, and a pivoting mount assembly 16. In addition, the left auxiliary hydraulic unit 10a includes a hydraulic actuation assembly 18 that is effective for actuating the left and the right auxiliary hydraulic units 10a, 10b. It should be noted that the hydraulic actuation assembly 18 could as well be mounted on the right auxiliary hydraulic unit 10b. Alternatively, the hydraulic ram assembly 14 could be replaced by a linear actuator 14a, as depicted in FIG. 6. The linear actuator 14a typically has a ram 27, coupled by a ball screw (not shown) to an electric motor 28. Electric leads 29 connect the linear actuator 14a to operator controls in the cab of the skid steer vehicle 20. With this substitution, the compact caster wheel system 10 is completely electrically operated, thereby eliminating the need for hydraulics.

As noted above, the compact caster wheel system 10 of the present invention is for use on a skid steer vehicle 20. The skid steer vehicle 20 has a pair of opposed, generally parallel side plates 22 defining the side margins of the skid steer vehicle 20. The skid steer vehicle 20 has four driving elements (wheels or track drivers) including a pair of fixed (e.g., not rotatably steerable) opposed rear wheels 24 and a pair of fixed opposed front wheels 25. In a tracked vehicle, the rear wheels 24 and the front wheels 25 are replaced by wheel-like track drivers. Alternatively, the skid steer vehicle 20 has a pair or driven tracks. By lifting the rear portion of each of the tracks clear of the underlying surface, the same pivoting, non-skidding effect is achieved as is described below with respect to lifting the rear wheels 24.

A pivoting rear engine access door 26 is disposed at the rear margin of the skid steer vehicle 20. The rear engine access door 26 is typically pivotable about one side edge margin. The rear engine access door 26 is opened frequently to service the hydraulic and oil reservoirs of the skid steer vehicle 20 and other servicing of the engine. It is very important that the rear engine access door 26 be freely accessible at all times.

Turning now to the first subcomponent of each of the units 10a, 10b of the compact caster wheel system 10, the housing assembly 12. The housing assembly 12 is preferably made of steel plate generally bent twice to form the desired U shape as indicated in the FIGS. 1, 2, and 3. Generally, the housing assembly 12 has a substantially rectangular front 30 that is flanked by a rearward extending inward side 32 and a rearward extending outward side 34. Preferably, the inward side 32 and the outward side 34 are parallel and spaced apart. A plurality of bores 36 (see FIG. 1) is defined in the inward side 32. Such bores 36 permit the respective auxiliary hydraulic units 10a, 10b to be bolted to the adjacent side plate 22 of the skid steer vehicle 20 in a semi-permanent manner. The housing assembly 12 is disposable rearward of the rearmost driving element and forward of the rear margin of the skid steer vehicle and projects laterally from the respective left and right side margins less than the rearmost driving element. Thereby, the footprint or envelope of the skid steer vehicle 20 is not enlarged by the incorporation of the compact caster wheel system 10. The auxiliary hydraulic units 10a, 10b do not have to be removed or otherwise modified to perform any of the tasks that the skid steer vehicle 20 is called upon to perform, unlike prior art systems. The auxiliary hydraulic units 10a, 10b may still be readily removed if damaged or for transfer to another skid steer vehicle 20, as desired.

While, in the preferred embodiment, the inward side 32 and the outward side 34 are not identical in shape, each has a trailing edge 38. The trailing edge 38 is defined by an upper extended margin 40, a first taper 42 that extends to a reduced margin 44. The reduced margin 44 in turn has a second taper 46 that leads to the bottom edge 48 of the respective inward side 32, outward side 34.

A ram mounting bore 50 is defined in registry in both the inward side 32 and outward side 34. A bolt 52 may be passed through the ram mounting bores 50 to mount the hydraulic ram assembly 14 to the housing assembly 12.

A pair of mount assembly bores 54 that are formed in registry in both the inward 32 and outward side 34 are disposed proximate the bottom edge 48. A bolt 56 may be passed through the mount assembly bores 54 to pivotally couple the pivoting mount assembly 16 to the housing assembly 12.

The housing assembly 12 further includes a top plate 58 and a relatively small back plate 60. A depending eye 61 is welded to the top plate 58, the back plate 60. The eye 61 has a bore defined therein that is in registry with the ram mounting bores 50.

The second subcomponent of the compact caster wheel system 10 is the hydraulic ram assembly 14. It should be noted that the hydraulic ram assembly 14 is an off-the-shelf item presently available in commerce. The hydraulic ram assembly 14 includes an upper yoke 62 for mounting the hydraulic ram assembly 14 to the housing assembly 12 by means of the eye 61. The upper yoke 62 is fixably coupled to the cylinder 64. The cylinder 64 includes a piston (not shown) therein that is dual acting, in that it may be driven in either direction within the cylinder 64. A pair of hydraulic connections 66 is disposed on the cylinder 64. A first hydraulic connection 66 drives the piston in a first direction by means of hydraulic fluid pumped therethrough. A second hydraulic connection 66 drives the piston within the cylinder 64 in the opposing direction by means of hydraulic fluid pumped therethrough. When hydraulic fluid is pumped into a one of the connections 66, the other connection 66 acts as a hydraulic return.

The piston includes a piston rod 68 that is extendable relative to the cylinder 64. A lower shackle 70 is coupled to the piston rod 68 for coupling the hydraulic ram assembly 14 to the pivoting mount assembly 16.

Turning to the third subcomponent to the compact caster wheel system 10, pivoting mount assembly 16. Each auxiliary hydraulic unit 10a, 10b includes an pivoting mount assembly 16. The pivoting mount assembly 16 is designed to support alternative ground engaging members. In a first embodiment, the ground engaging member is a caster wheel (see FIGS. 1, 2, and 3) and in a second embodiment the ground engaging member is a foot (see FIG. 1a).

For use with a caster, the pivoting mount assembly 16 includes a cross tube 72 that has an axial bore 74 defined therein. Preferably, the axial bore 74 is disposed in registry with the mount assembly bores 54 of the housing assembly 12. The cross tube 72 is coupled to a swivel tube 76 and is disposed orthogonal thereto. The swivel tube 76 has an axial bore defined therein that may include support bushings. A cover 78 is disposed on top of the swivel tube 76. An eye 79 is coupled to the swivel tube 76 on the opposite side as cross tube 72. The eye 79 has a bore defined therein.

A ground engaging assembly comprising an exemplary caster assembly 84 may be rotatably coupled to the pivoting mount assembly 16. A caster assembly 84 includes a wheel 86 that is supported by a support bridge 88 by means of an axle 90. The support bridge 88 preferably includes an upright post (not shown) that is preferably disposed within the swivel tube 76 and supported by bushings. It should be noted that the caster assembly 84 may be mounted directly to the piston rod 68 that is extendable relative to the cylinder 64 and is then deployed straight up and down. This eliminates the need for the pivoting mount assembly 16.

As depicted in FIG. 3, a caster retainer 102 may optionally be included. The caster retainer 102 is an elongate bar 104 that depends from the outward side 34 and is pivotally coupled thereto by a bolt 106. When the caster 84 is in the up, disengaged disposition, the bar 104 may be raised to admit the caster 84 and then lowered to engage the outboard side of the caster 84, thereby restraining the caster 85 in a nearly vertical (higher) disposition preventing the caster 84 from rotating outwards. The nearly vertical (higher) disposition is advantageous in further minimizing the footprint of the skid steer vehicle 20.

Alternatively, the ground engaging assembly may be a stabilizing foot 82 in order to impart stability to the rear portion of the skid steer vehicle 20. See FIG. 1a. In such embodiment, a cross tube 72 having an axial bore 74, as noted above, is coupled to a box section support 80. The cross tube 72 may be rotatably coupled to the housing assembly 12. The box section support 80 is preferably a four-sided steel tube having a square cross-section. Generally opposite to the cross tube 72 is an eye support 79 that is coupled to an opposing side of the box section support 80 and has a bore 84 defined therein. The eye support 79 may be rotatably coupled to the lower shackle 70. A foot 82 that is preferably a rectangular steel plate is coupled to the bottom margin of the box section support 80.

The final subcomponent of the compact caster wheel system 10 is the hydraulic actuation assembly 18. In the embodiment of FIGS. 1-3, the hydraulic actuation assembly 18 is mounted to the left auxiliary hydraulic unit 10a. The hydraulic actuation assembly 18 is comprised of an electric hydraulic pump 92. The electric hydraulic pump 92 is preferably designed to operate with 12 V DC power that is available from the skid steer vehicle 20 and is coupled thereto by wires 94 via a control unit 95. The electric hydraulic pump 92 is preferably a two-way electric hydraulic pump, capable of pumping hydraulic fluid in two different directions, although a one way pump with a two way reversing valve or other suitable arrangement may also be used. The plurality of control wires 94 are coupled to the electric hydraulic pump 92. The control wires 94 extend form the control unit 95 to the cab of the skid steer vehicle 20. Preferably, a switch disposed in the cab of the skid steer vehicle 20 has three positions, being neutral, up, and down. In the neutral disposition, the electric hydraulic pump 92 is quiescent. In the up disposition, the electric hydraulic pump 92 is pumping through a first hydraulic outlet. In the down disposition, the electric hydraulic pump 92 is pumping through a second hydraulic outlet port. A hydraulic reservoir 96 is disposed beneath the electric hydraulic pump 92 and is in fluid communication therewith. A first hydraulic line 98 is connected to a first hydraulic outlet port of the electric hydraulic pump 92. A second hydraulic line 100 is connected to a second hydraulic outlet port of the electric hydraulic pump 92.

Each of the hydraulic lines 98, 100 is connected to a respective T-fitting 102. The T-fitting 102 connected to a hydraulic line 98 splits the hydraulic fluid from the hydraulic line 98 to hydraulic lines 98a, 98b. Hydraulic line 98a is coupled to the cylinder 64 of the left auxiliary hydraulic unit 10a and powers the piston disposed therein in a first direction. The hydraulic line 98b is fluidly coupled to the cylinder 64 of the right auxiliary hydraulic unit 10b and powers the piston disposed in the cylinder 64 in the same direction as noted above, with respect to the left auxiliary hydraulic unit 10a. The hydraulic line 100a is fluidly coupled to the cylinder 64 of the left auxiliary hydraulic unit 10a and drives the piston disposed in the cylinder 64 in the opposite direction to that noted above. The hydraulic line 100b is in fluid communication with the cylinder 64 of the right auxiliary hydraulic unit 10b and drives the piston disposed in the cylinder 64 in the same direction as that noted above with respect to the hydraulic line 100a.

It should be noted that the cylinders 64 of the respective left and right auxiliary lift unit 10a, 10b and the hydraulic lines 98, 100 comprise a closed volume that is preferably filled with hydraulic fluid. The hydraulic fluid is free to move back and forth between the cylinders 64 of the respective left and right auxiliary hydraulic unit 10a, 10b. The effect is that on uneven ground, the respective casters 84 will tend to be self-leveling when in a partially extended disposition that is less than the fully engaged disposition. In this disposition, neither cylinder 64 is fully extended or bottomed out. For example, as one caster 84 engages the ground, hydraulic fluid will be transferred or moved to the cylinder 64 on the opposite side thereby extending the caster 84 on that side a greater distance to engage the ground and thereby self-level.

Figure 5:
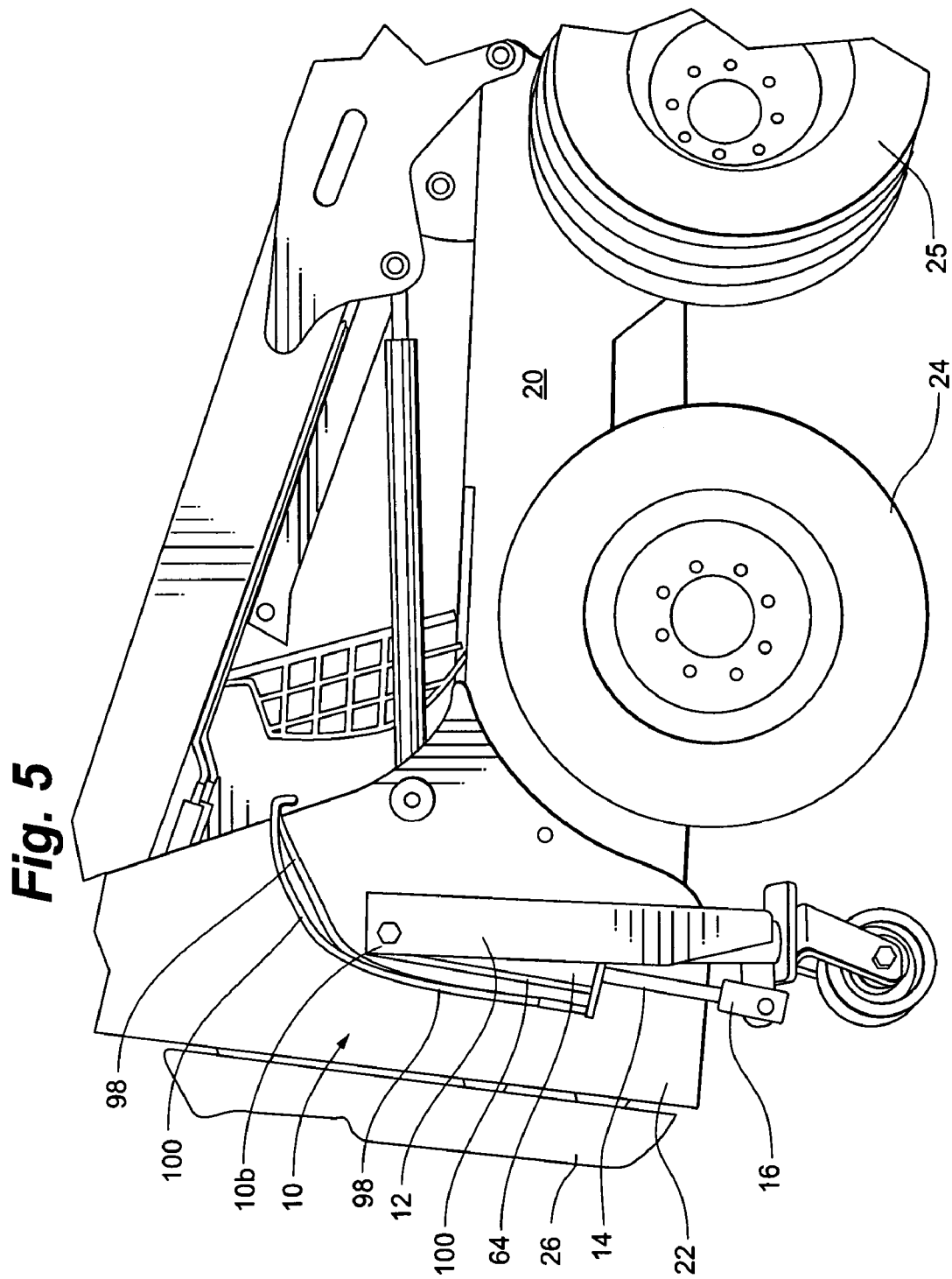
FIG. 5 is a side elevational view of a second embodiment of the present invention depicting the right side auxiliary hydraulic unit mounting an optional caster, the caster being in the extended, engaged disposition.
Figure 4:
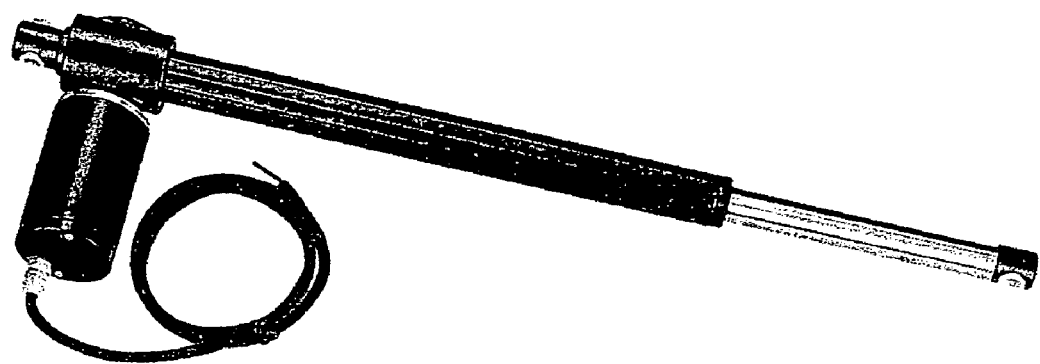

An alternative embodiment of the hydraulic actuation assembly 18 is depicted in FIG. 5. In this embodiment, hydraulic actuation is directly coupled to the hydraulic system of the skid steer vehicle 20. The controls in the cab are similar to those described above. In this case, a pair of hydraulic lines 98, 100 extend from the central hydraulic system of the skid steer vehicle 20 to the respective cylinders 64 of the left and right auxiliary hydraulic unit 10a, 10b.

In assembly, the housing assembly 12 of the compact caster wheel system 10 is first bolted to the side plate 22 of the skid steer vehicle 20. This is accomplished by passing bolts through the bores 36 defined in the inward side 32 and through corresponding bores defined in the side plate 22. Spacers may be interposed between the outside margin of the inward side 32 and the side plate 22 as desired to space the respective units 10a, 10b of the compact caster wheel system 10 a desired distance from the side plate 22. The hydraulic ram assembly 14 is coupled to the housing assembly 12 and the pivoting mount assembly 16 by placing the upper yoke 62 over the eye 61 and in registry with the bore defined in the eye 61. The bolt 52 (or a pin) is then passed through the ram mounting bore 50, the first side of the upper yoke 62, the bore defined in the eye 61, the second side of the upper yoke 62 and finally through the ram mounting bore 50 defined in the inward side 32.

At the other end of the hydraulic ram assembly 14, the lower shackle 70 is passed over the eye 79 of the pivoting mount 16. The bolt 56 (or a pin) is passed through the mount assembly bore 54 defined in the outward side 34, through the first side of the lower shackle 70, through the bore 81 defined in the eye 79, through the second side of the lower shackle 70, and finally through the mount assembly bore 54 defined in the inward side 32. It should be noted that the caster 84 or the foot 82 may be alternatively mounted in this manner.

The hydraulic lines 98, 100 can then be connected to the cylinder 64 of the hydraulic ram assembly 14.

In operation, the ground engaging member being the caster 84 and the pivoting mount assembly 16 being in the up disengaged disposition (FIG. 3), the switch in the cab is utilized to control the rotation of the pivoting mount assembly 16. By selecting the down selection on the switch, the control wires 94 direct the appropriate command to the electric hydraulic pump 92 to power the piston in the cylinder 64 to extend the piston rod 68 of both the units 10a, 10b. If the down selection of the switch is held until the piston rod 68 is fully extended, the pivoting mount assembly 16 goes into the down, engaged disposition, as depicted in FIG. 1, engaging the wheels 24 on the underlying surface. In such disposition, the self-leveling feature described above is not available.

Assuming a two inch difference in the elevation of the two surfaces that the respective casters 84 will bear upon, the self-leveling feature is available if the deployment of the pivoting mount assembly 16 is halted with about an inch of travel left in the respective piston rods 68. In such event, the first caster 84 would have contacted the surface about an inch before the travel of the respective piston rods 68 was stopped. The travel of the second caster 84 will continue downward to impact the lower surface by the shifting of hydraulic fluid from the stopped cylinder 64 to the other cylinder 64 that still has some distance to travel until the respective caster 84 impacts the underlying surface. When the switch in the cab is placed in the neutral disposition, the hydraulic system connecting the two cylinders 64 is a closed looped system, as described above, and as the skid steer 20 travels over surfaces of varying heights, the two casters 84 will self-level by acting to transfer or move a certain quantity of hydraulic fluid back and forth between the two cylinders 64. Hydraulic fluid is free to move from cylinder 64 to cylinder 64 to affect the self-leveling action.

It should be noted that when the pivoting mount assembly 16 is coupled to a foot 82, the two pistons 68 are typically extended to their maximum disposition and the pivoting mount assembly 16 is in the extended, engaged disposition, there being no self-leveling available or desirable when the feet 82 are engaged with the surface beneath the skid steer 20. The feet 82 are held in a single position by direct hydraulic pressure.

Transition from the down, engaged disposition of either the caster 84 or the foot 82 is accomplished from the cab by selecting the up position on the switch. Such selection operates the electric hydraulic pump 92 in the opposite direction as that previously described to reflect lowering of the pivoting mount assembly 16. The respective pistons 68 are withdrawn into their respective cylinders 64. This causes rotation of the pivoting mount assembly 16 from a down disposition through an arc of approximately 90° to the up disposition. During this transition, the wheels 24 are gradually lowered into contact with the underlying surface.

When in the up disposition, the casters 84 typically rotate above the swivel tube 76 such that the top portion of the respective wheels 86 is angled outward from the skid steer 20. To hold the respective wheels 86 is a more upright disposition, the wheel retainer 104 (FIG. 1) is manually rotated out and the wheel 86 is manually rotated into a more normal disposition. The wheel retainer 104 may then be released to rotate downward alongside the wheel 86, capturing the wheel 86 in the more vertical disposition.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

What is claimed is:

1. An auxiliary lift system for use with a skid steer vehicle, comprising:

first and second auxiliary lift unit assemblies being spaced apart and disposable on respective left and right side margins of the skid steer vehicle and disposable rearward of the rearmost driving element and forward of the rear margin of the skid steer vehicle and projecting laterally from the respective left and right side margins less than the rearmost driving element;

each of the first and second auxiliary lift unit assemblies having a respective housing assembly being couplable to the respective left and right side margins of the skid steer vehicle;

first and second ram assemblies, a respective ram assembly being operably coupled to a respective one of the first and second auxiliary lift unit assemblies; and first and second caster assemblies, a respective caster assembly being operably coupled to a respective ram assembly such that actuation of the respective ram assembly effects shifting of the caster assembly between an retracted, disengaged disposition and an extended, engaged disposition.

2. The auxiliary lift system of claim 1 including a respective caster assembly being pivotally coupled to a respective pivoting mount assembly, each respective pivoting mount assembly being disposed between a respective ram assembly and a respective caster.

3. The auxiliary lift system of claim 1 including selectively replacing a respective caster assembly with a respective stabilizing foot assembly, a respective stabilizing foot being pivotally coupled to a respective pivoting mount assembly, each respective pivoting mount assembly being disposed between a respective ram assembly and a respective stabilizing foot assembly.

4. The auxiliary lift system of claim 1 including a dedicated hydraulic actuation assembly operably fluidly coupled to each of the respective hydraulic ram assemblies for effecting coordinated actuation thereof.

5. The compact caster wheel system of claim 1 being in fluid communication with a hydraulic system of the skid steer vehicle.

6. The auxiliary lift system of claim 1 being disposed substantially within a footprint defined by the skid steer vehicle when the first and second auxiliary lift unit assemblies are disposed on respective left and right side margins of the skid steer vehicle.

* * * * *